(12) United States Patent
Kanza et al.

(10) Patent No.: US 11,902,798 B2
(45) Date of Patent: Feb. 13, 2024

(54) REAL-TIME ML-SUPPORTED RADIO PROPAGATION COMPUTATION FOR RAN PLANNING

(71) Applicant: AT&T Intellectual Property I, L.P., Atlanta, GA (US)

(72) Inventors: Yaron Kanza, Fair Lawn, NJ (US); Arun Jotshi, Parsippany, NJ (US); Velin Kounev, Weehawken, NJ (US); Krystian Czapiga, Hillsborough, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 362 days.

(21) Appl. No.: 17/389,416

(22) Filed: Jul. 30, 2021

(65) Prior Publication Data

US 2022/0377568 A1 Nov. 24, 2022

Related U.S. Application Data

(60) Provisional application No. 63/189,991, filed on May 18, 2021.

(51) Int. Cl.
*H04W 16/18* (2009.01)
*G06T 7/70* (2017.01)
(Continued)

(52) U.S. Cl.
CPC ............ *H04W 16/18* (2013.01); *G06T 7/70* (2017.01); *G06T 15/06* (2013.01); *G06T 15/506* (2013.01);
(Continued)

(58) Field of Classification Search
CPC ......... G06T 7/70; G06T 15/06; G06T 15/506; G06T 2207/10032; G06T 2207/20016;
(Continued)

(56) References Cited

U.S. PATENT DOCUMENTS 9,723,588 B1 8/2017 Urrutia et al.
2013/0281100 A1* 10/2013 Lanzo ................... H04W 16/24
455/446

(Continued)

FOREIGN PATENT DOCUMENTS

WO WO-2020123208 A1 6/2020

OTHER PUBLICATIONS

Q. Niu, Y. Nie, S. He, N. Liu and X. Luo, "RecNet: A Convolutional Network for Efficient Radiomap Reconstruction," 2018 IEEE International Conference on Communications (ICC), Kansas City, MO, USA, 2018, pp. 1-7. (Year: 2018).*

(Continued)

*Primary Examiner* — King Y Poon
*Assistant Examiner* — Vincent Peren
(74) *Attorney, Agent, or Firm* — Guntin & Gust, PLC; Mark Wilinski

(57) ABSTRACT

Aspects of the subject disclosure may include, for example, network deployment or radio-propagation computation based on a combination of photon mapping and machine learning including supporting near-real-time computation of the radio transmissions for different layouts of antennas and allowing examination of a large variety of antenna locations and layouts, changing configuration details, e.g., tilting antennas or optimally selecting the sector that each antenna covers, and so on. Other embodiments are disclosed.

20 Claims, 17 Drawing Sheets

(51) Int. Cl.
*H04B 17/391* (2015.01)
*G06T 15/06* (2011.01)
*G06T 15/50* (2011.01)

(52) U.S. Cl.
CPC .............. *H04B 17/3912* (2015.01); *G06T 2207/10032* (2013.01); *G06T 2207/20016* (2013.01); *G06T 2207/20081* (2013.01); *G06T 2207/20084* (2013.01)

(58) Field of Classification Search
CPC .......... G06T 2207/20081; G06T 2207/20084; H04B 17/3912; H04B 17/3913; H04W 16/18
See application file for complete search history.

(56) References Cited

U.S. PATENT DOCUMENTS

| | | | |
|---|---|---|---|
| 2017/0245238 | A1 | 8/2017 | Kim et al. |
| 2020/0169895 | A1* | 5/2020 | Chen ............... G06N 3/045 |
| 2022/0159486 | A1* | 5/2022 | Zhang ............... H04L 43/55 |
| 2022/0329331 | A1* | 10/2022 | Budic ............... H04B 17/3913 |
| 2022/0377570 | A1 | 11/2022 | Kanza et al. |
| 2023/0078929 | A1 | 3/2023 | Kanza et al. |
| 2023/0224055 | A1* | 7/2023 | Ramiro Moreno ..... H04L 41/16 370/252 |

OTHER PUBLICATIONS

N. Kuno, W. Yamada, M. Sasaki and Y. Takatori, "Convolutional Neural Network for Prediction Method of Path Loss Characteristics considering Diffraction and Reflection in an Open-Square Environment," 2019 URSI Asia-Pacific Radio Science Conference (AP-RASC), New Delhi, India, 2019, pp. 1-3. (Year: 2019).*
T. Imai, K. Kitao and M. Inomata, "Radio Propagation Prediction Model Using Convolutional Neural Networks by Deep Learning," 2019 13th European Conference on Antennas and Propagation (EuCAP), Krakow, Poland, 2019, pp. 1-5. (Year: 2019).*
K. Li, J. Chen, B. Yu, Z. Shen, C. Li and S. He, "Supreme: Fine-grained Radio Map Reconstruction via Spatial-Temporal Fusion Network," 2020 19th ACM/IEEE International Conference on Information Processing in Sensor Networks (IPSN), Sydney, NSW, Australia, 2020, pp. 1-12. (Year: 2020).*
L. Wu et al., "Received Power Prediction for Suburban Environment based on Neural Network," 2020 International Conference on Information Networking (ICOIN), Barcelona, Spain, 2020, pp. 35-39. (Year: 2020).*
R. Levie, Ç. Yapar, G. Kutyniok and G. Caire, "RadioUNet: Fast Radio Map Estimation With Convolutional Neural Networks," in IEEE Transactions on Wireless Communications, vol. 20, No. 6, pp. 4001-4015, Jun. 2021. (Year: 2021).*
K. Li et al., "Model and Transfer Spatial-Temporal Knowledge for Fine-Grained Radio Map Reconstruction," in IEEE Transactions on Cognitive Communications and Networking, vol. 8, No. 2, pp. 828-841, Jun. 2022. (Year: 2022).*
"5G", Wikipedia: https://en.wikipedia.org/wiki/5G, available at least as of May 10, 2021, May 10, 2021, 29 pgs.
"Atoll Overview", Atoll Radio Planning Software Overview (RF Planning and Optimisation) | Forsk, available at least as of May 10, 2021, 6 pages.
"Attenuation", Wikipedia, available at least as of May 10, 2021, 8 pages.
"Free-space path loss", Wikipedia, available at least as of May 10, 2021, 5 pages.
"Photon mapping", Wikipedia, available at least as of May 10, 2021, 4 pages.
"Quadtree", Wikipedia, available at least as of May 10, 2021, 12 pages.
"Radio propagation", Wikipedia, available at least as of May 10, 2021, 13 pages.
"Signal-to-interference-plus-noise ratio", Wikipedia: https://en.wikipedia.org/wiki/Signal-to-interference-plus-noise_ratio, available at least as of May 10, 2021, May 10, 2021, 3 pgs.
"TensorFlow Core", Machine Learning for Beginners and Experts, Visit Forum https://discuss.tensorflow.org, available at least as of May 10, 2021, 8 pages.
Alla Chaitanya, Chakravarty R. et al., "Interactive Reconstruction of Monte Carlo Image Sequences using a Recurrent Denoising Autoencoder", ACM Transactions on Graphics, vol. 36, No. 4, Article 98, Jul. 2017, 12 pages.
Jensen, Henrik W., "Global Illumination using Photon Maps", Extended version of Rendering Techniques '96 (Proceedings of the Seventh Eruographics Workshop on Rendering), 1996, 17 pages.

* cited by examiner

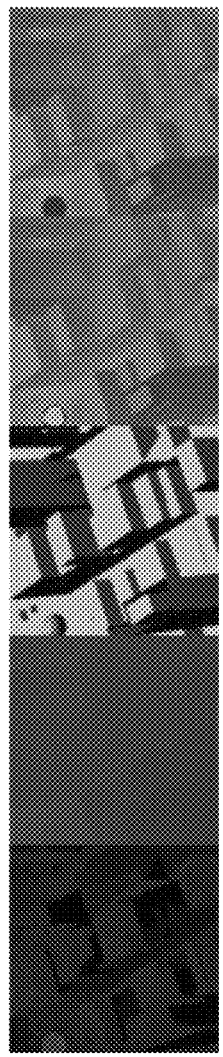
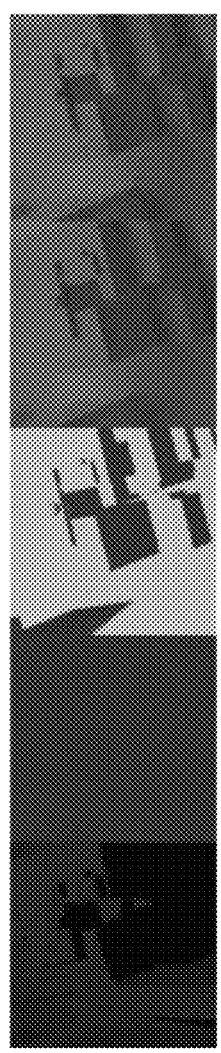
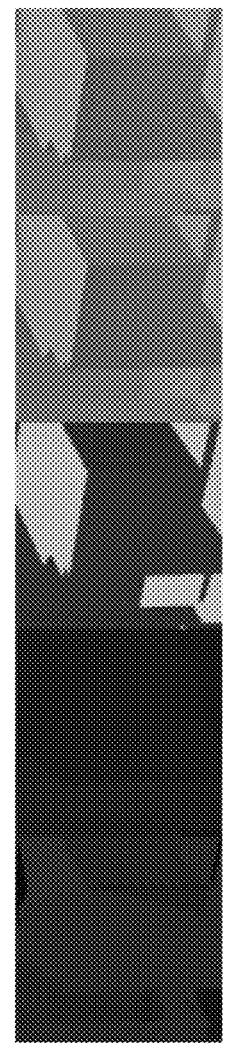
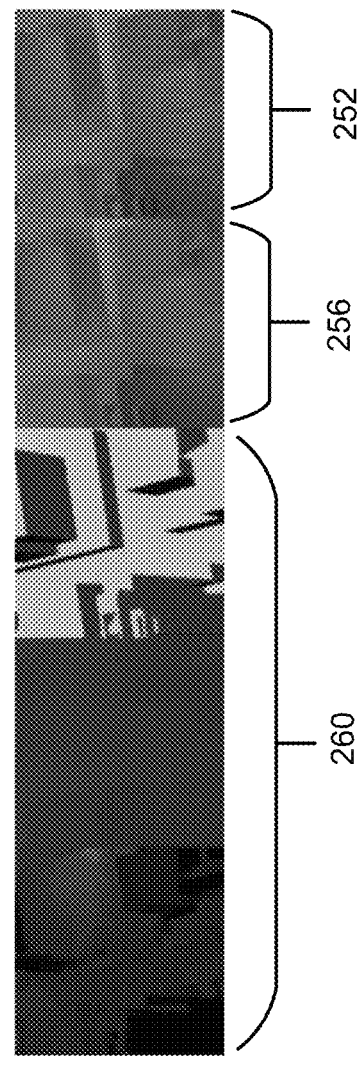
FIG. 2J
FIG. 2K
FIG. 2L
FIG. 2M

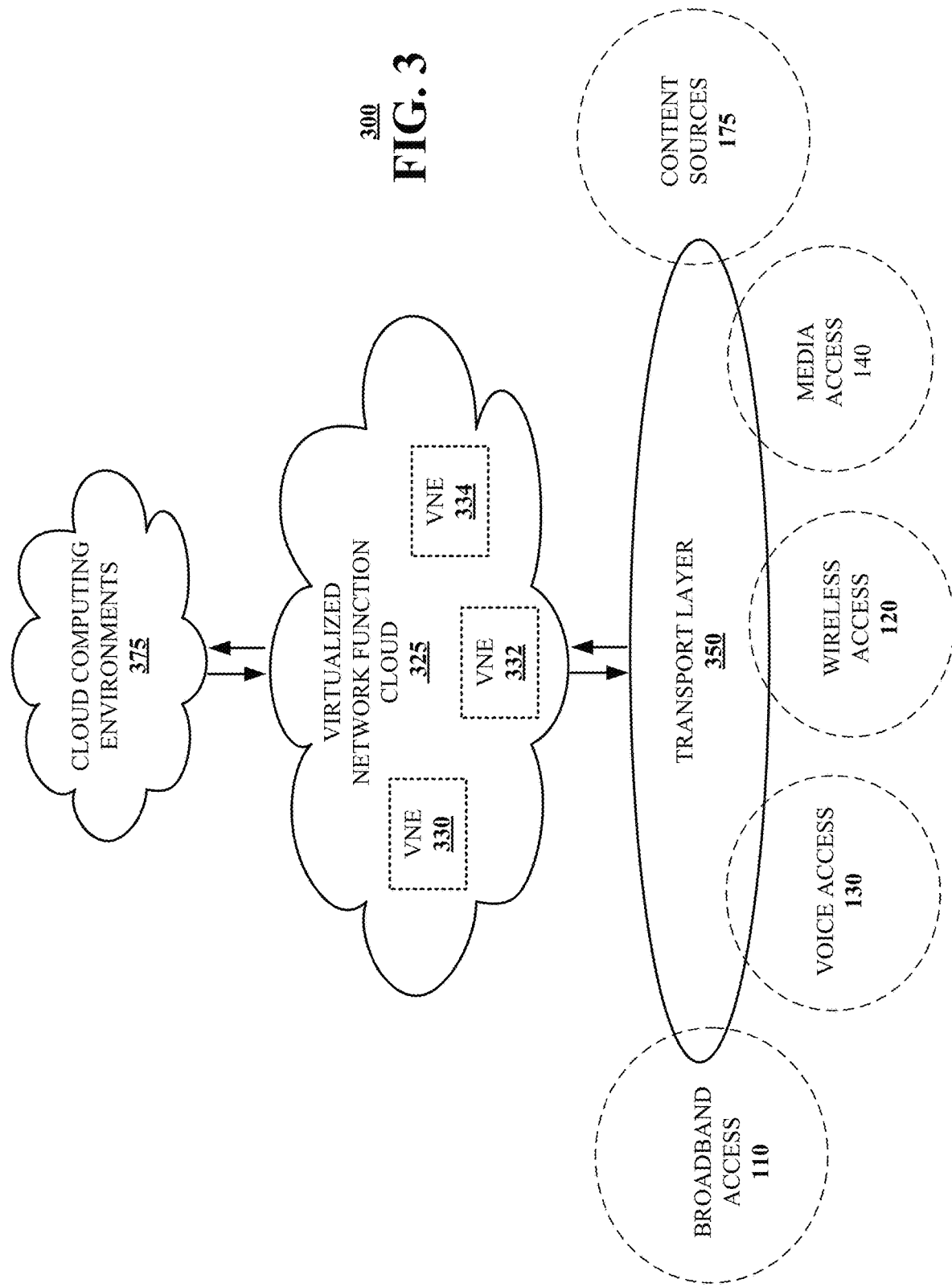

REAL-TIME ML-SUPPORTED RADIO PROPAGATION COMPUTATION FOR RAN PLANNING

CROSS-REFERENCE TO RELATED APPLICATIONS

This application claims the benefit of priority to U.S. Provisional Patent Application No. 63/189,991, filed May 18, 2021. All sections of the aforementioned application are incorporated herein by reference in their entirety.

FIELD OF THE DISCLOSURE

The subject disclosure relates to a real-time machine learning (ML)-supported radio propagation computation for radio access network (RAN) planning, such as in 5G and millimeter (mm)-wave network planning using photon mapping.

BACKGROUND

One of the main activities in planning of cellular networks is deciding where to position equipment such as the cellular antennas. Choosing antenna and/or other equipment locations is needed for building a reliable cellular network, with good coverage and reduced or no interference between transmissions.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
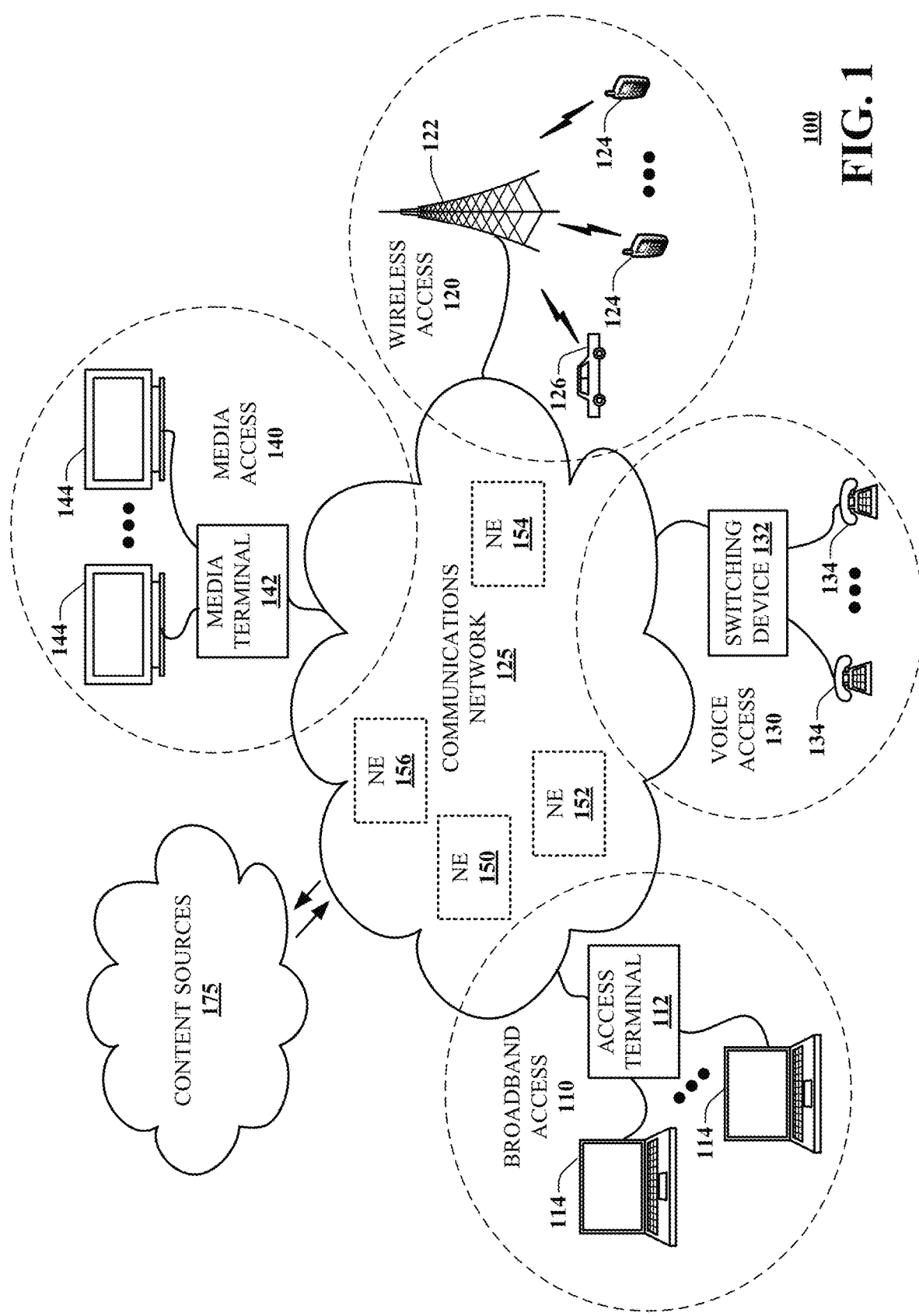
FIG. 1 is a block diagram illustrating an exemplary, non-limiting embodiment of a communications network in accordance with various aspects described herein.

The subject disclosure describes, among other things, illustrative embodiments for network deployment or radio propagation computation based on a combination of photon mapping and machine learning (ML) including supporting near-real-time computation of the radio transmissions for different layouts of antennas and allowing examination of a large variety of antenna locations and layouts, changing configuration details, e.g., tilting antennas or optimally selecting the sector that each antenna covers, and so on.

Embodiments present an approach for selecting the locations of the cellular antennas, where photon mapping and ML are combined to simulate radio propagation and create a fast estimation of cellular coverage provided by an antenna positioned at a tested location. The approach can revolutionize or improve network planning by providing planners with a tool to examine a large variety of deployment options and select the most optimal positioning among the tested layouts. The approach can revolutionize or improve network planning for high-frequency networks, like 5G, because these networks are highly affected by geospatial obstacles. Moreover, the ability to examine in real-time the effect of an antenna could significantly improve planning of ad hoc networks and could lay the foundations for planning dynamic networks where antennas are mounted on cars, drones, and other vehicles. With the fast adoption of artificial intelligence (AI) and ML for various planning tasks, it is expected that in the next decades there would be an extensive use of ML in network planning and these exemplary embodiments is part of that revolutionary change.

For positioning cellular antennas and testing optional layouts of cellular networks, the coverage of each antenna may be estimated. The computation of the cellular coverage is based on a propagation model of the electromagnetic transmission and a geospatial model of the geographical obstacles in the deployment area. This computation is becoming critical and demanding for new generations of cellular networks, like 5G, because shortwaves are used in such networks and they are blocked by obstacles like buildings, trees, and the terrain. One problem is how to compute in near-real-time the coverage of a cellular antenna with shortwaves (like 5G or mm-waves) in an urban area. Current systems for computing the coverage of antennas in planning tools like Atoll are based on ray tracing algorithms. In such algorithms there is a tradeoff-shooting many rays is expensive and takes a long time to compute while shooting a small number of rays leads to low-quality results where the resolution is too low for network planning. A typical planning task using ray tracing takes hours to compute; aspects of this disclosure may compute the cellular propagation in fractions of a second.

One or more embodiments can combine photon mapping with ML and adapting that to wireless propagation models and to the interference that is caused by two overlapping antennas with similar frequencies. Photon mapping is similar to ray tracing, however, instead of shooting rays from the camera to light sources or from light sources to the camera, first, photons are dispatched from light sources and mapped to obstacles in the rendered setting, and then, the scene is rendered based on the photons seen from the viewpoint of the camera. Like in ray tracing, the quality of the result depends on the number of photons that are sent from the light sources, and there is a tradeoff between the quality of the rendering and the computation time, according to the number of dispatched photons (their density in the scene). To overcome this, in an exemplary method, a ML model is trained to transform low-resolution photon mappings into high-resolution rendered scenes, that is, the ML model is used for image restoration. The urban environment is modeled using three-dimensional (3D) polygonal shapes, and the ML restoration process is applied to each face of a 3D polygonal shape in the scene. Because the ML model does not rely on extensive geometric computations, it is much faster than the high-resolution photon mapping. The result is a high-resolution image, of the cellular coverage, that is computed very fast. Each one of the two steps (photon mapping and applying the ML model to different walls) can be done in parallel using graphics processing units (GPUs). When shooting photons, the computation of the trajectory of a photon is independent of the trajectories of other photons, so this step can be parallelized. Computing the restoration of a face of a polygonal shape is independent of the restoration of other shapes or faces. Hence, using GPUs, the ray tracing is parallelized to speed up the first step and the restoration using the ML model is parallelized to accelerate the second step. The photon mapping uses a selected propagation model when mapping the photons to walls. The system computes intersections between coverage areas of different antennas if they have a similar frequency. This can be presented on the screen as areas of interference or can be provided to an optimizer that would try to minimize such interference. Other embodiments are described in the subject disclosure.

Referring now to FIG. 1, a block diagram is shown illustrating an example, non-limiting embodiment of a system 100 in accordance with various aspects described herein. For example, system 100 can facilitate in whole or in part network deployment or radio propagation computation based on a combination of photon mapping and machine learning including supporting near-real-time computation of the radio transmissions for different layouts of antennas and allowing examination of a large variety of antenna locations and layouts, changing configuration details, e.g., tilting antennas or optimally selecting the sector that each antenna covers, and so on. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
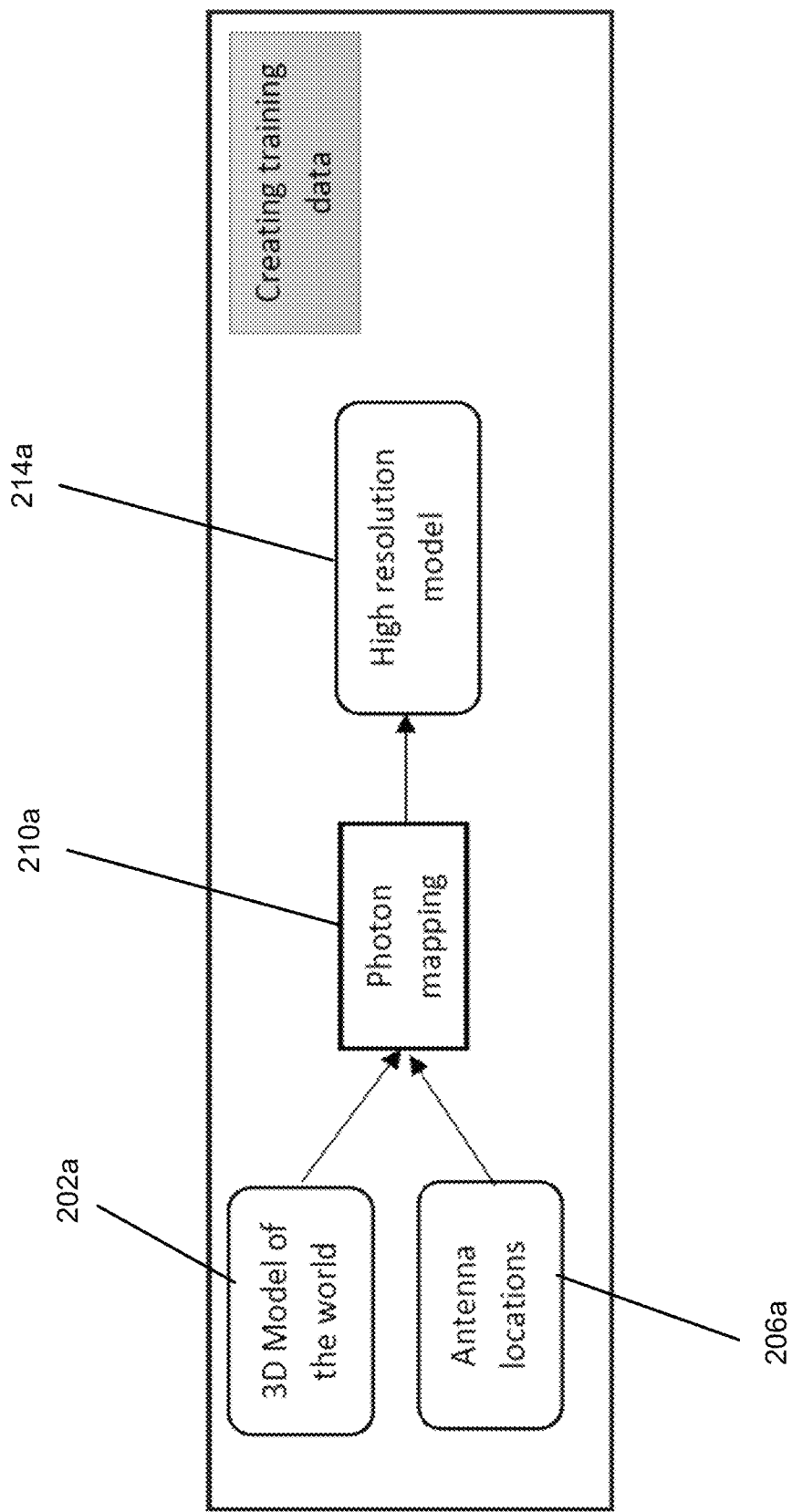
FIG. 2A-2O are block diagrams illustrating an example, non-limiting embodiments of systems functioning within the communication network of FIG. 1 in accordance with various aspects described herein.
Figure 2B:
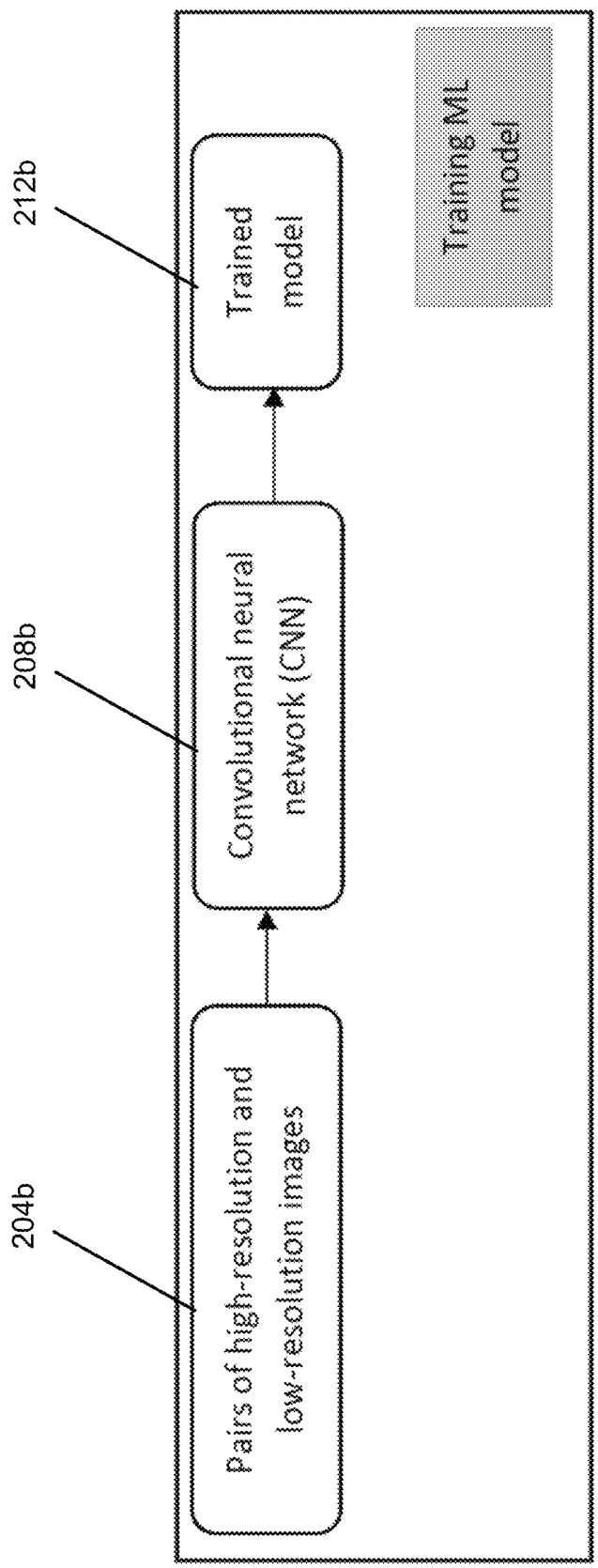
FIG. 2P depicts an illustrative embodiment of a method in accordance with various aspects described herein.
Figure 2C:
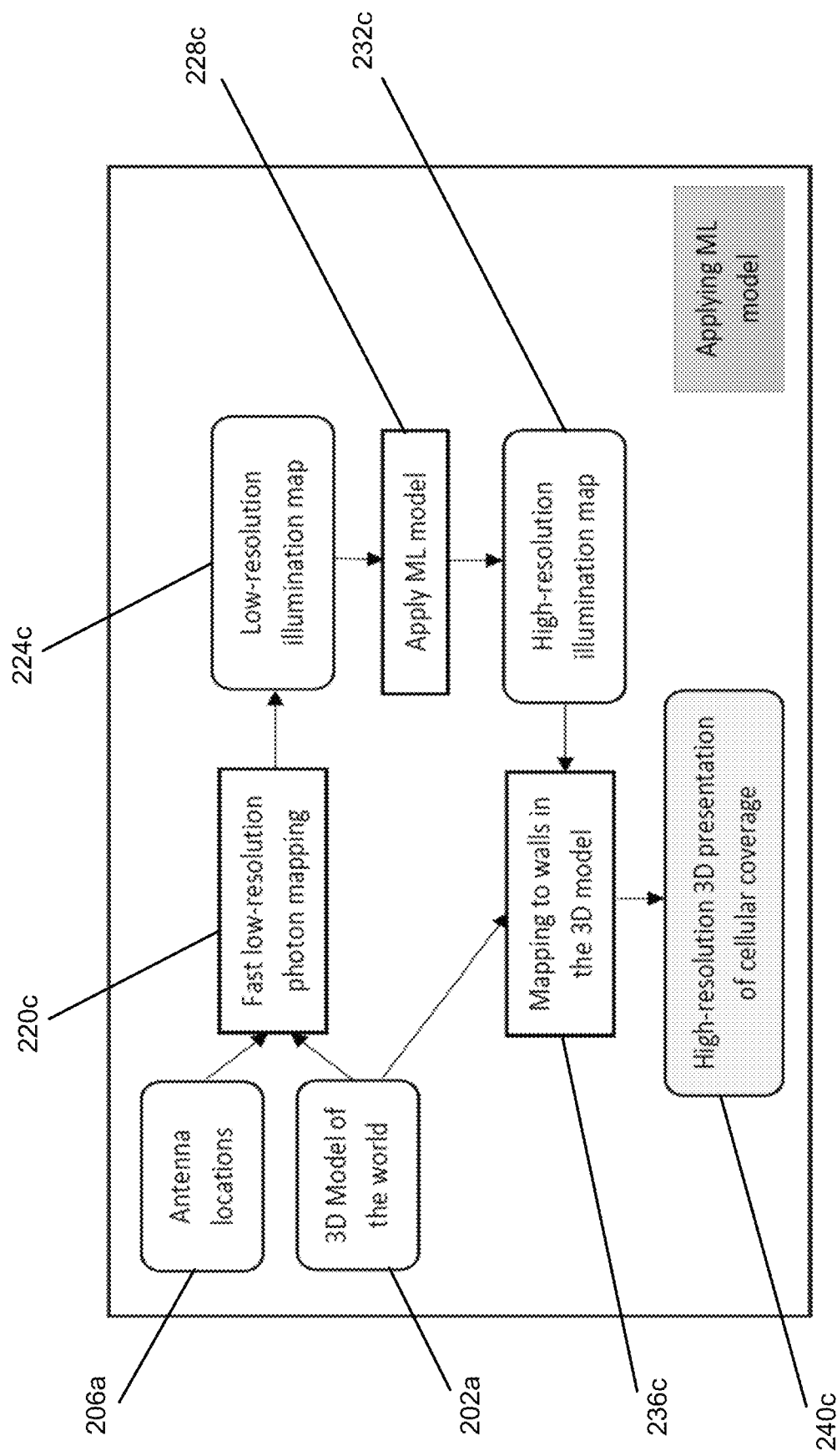
Figure 2D:
Figure 2E:
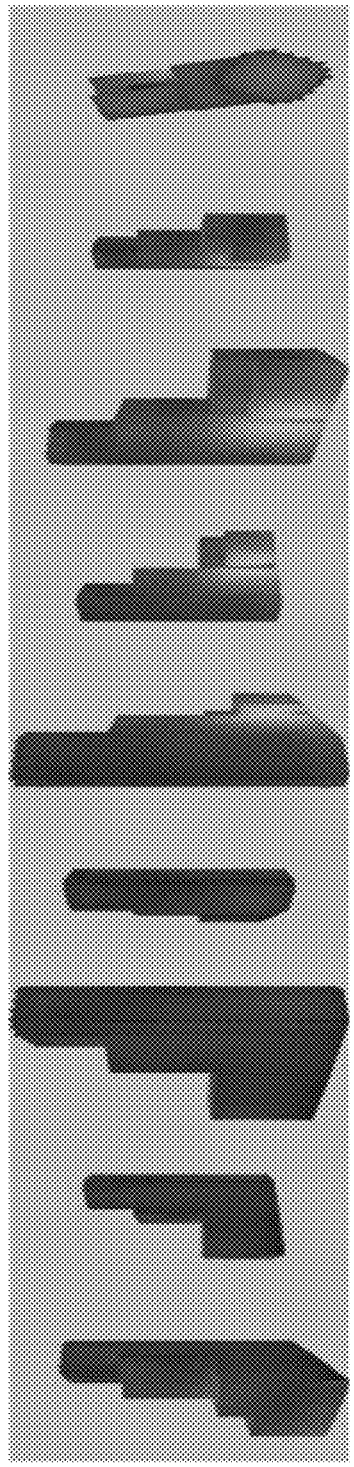
Figure 2F:
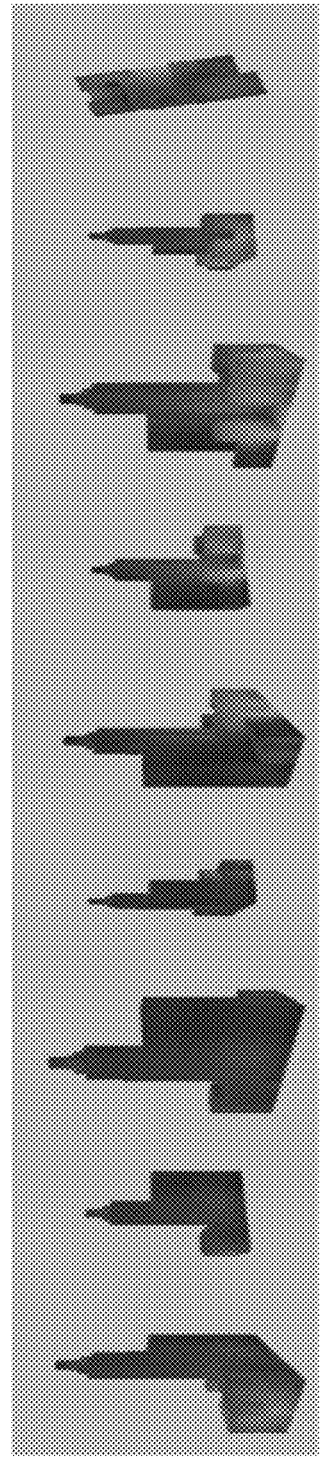
Figure 2G:
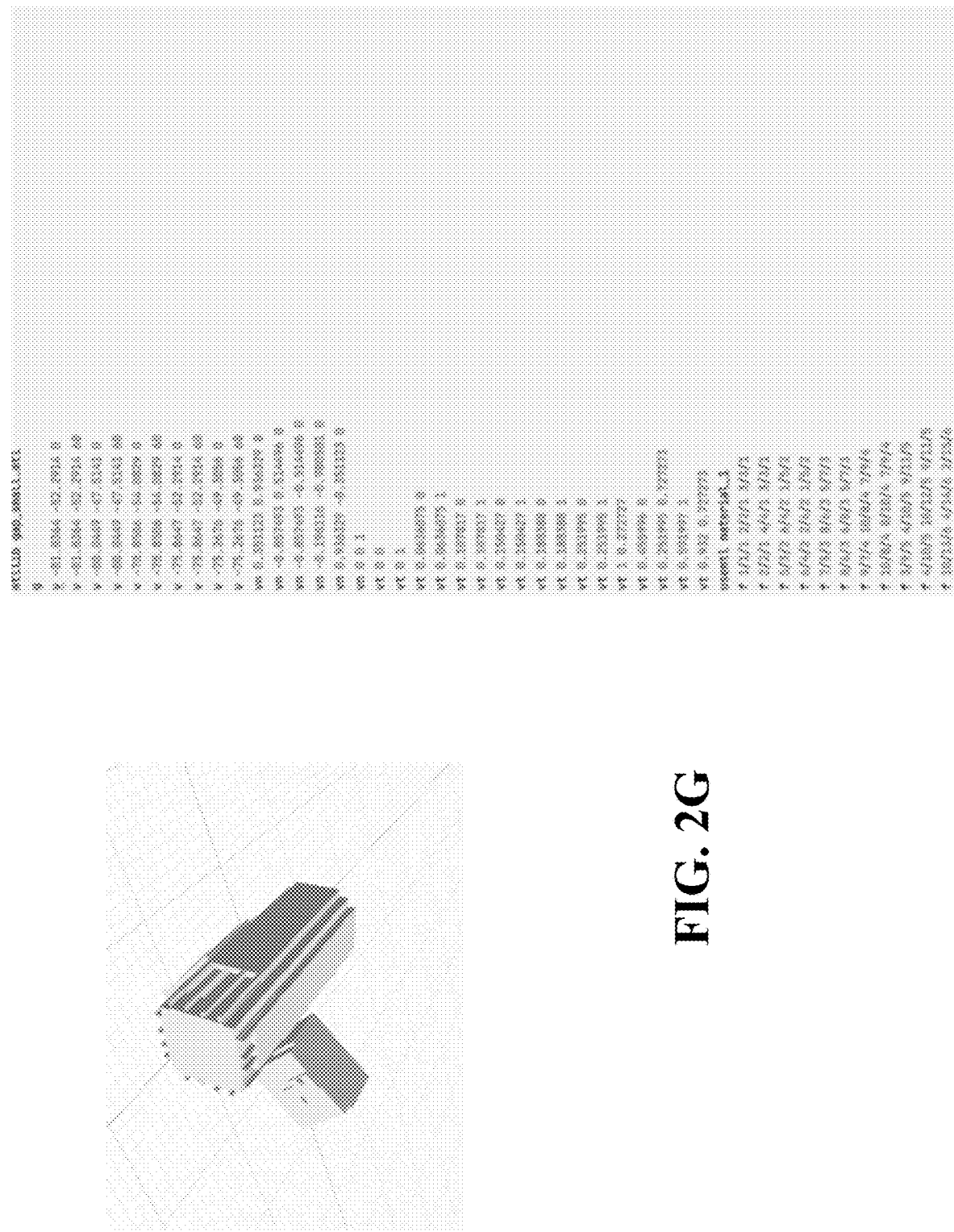
Figure 2H:
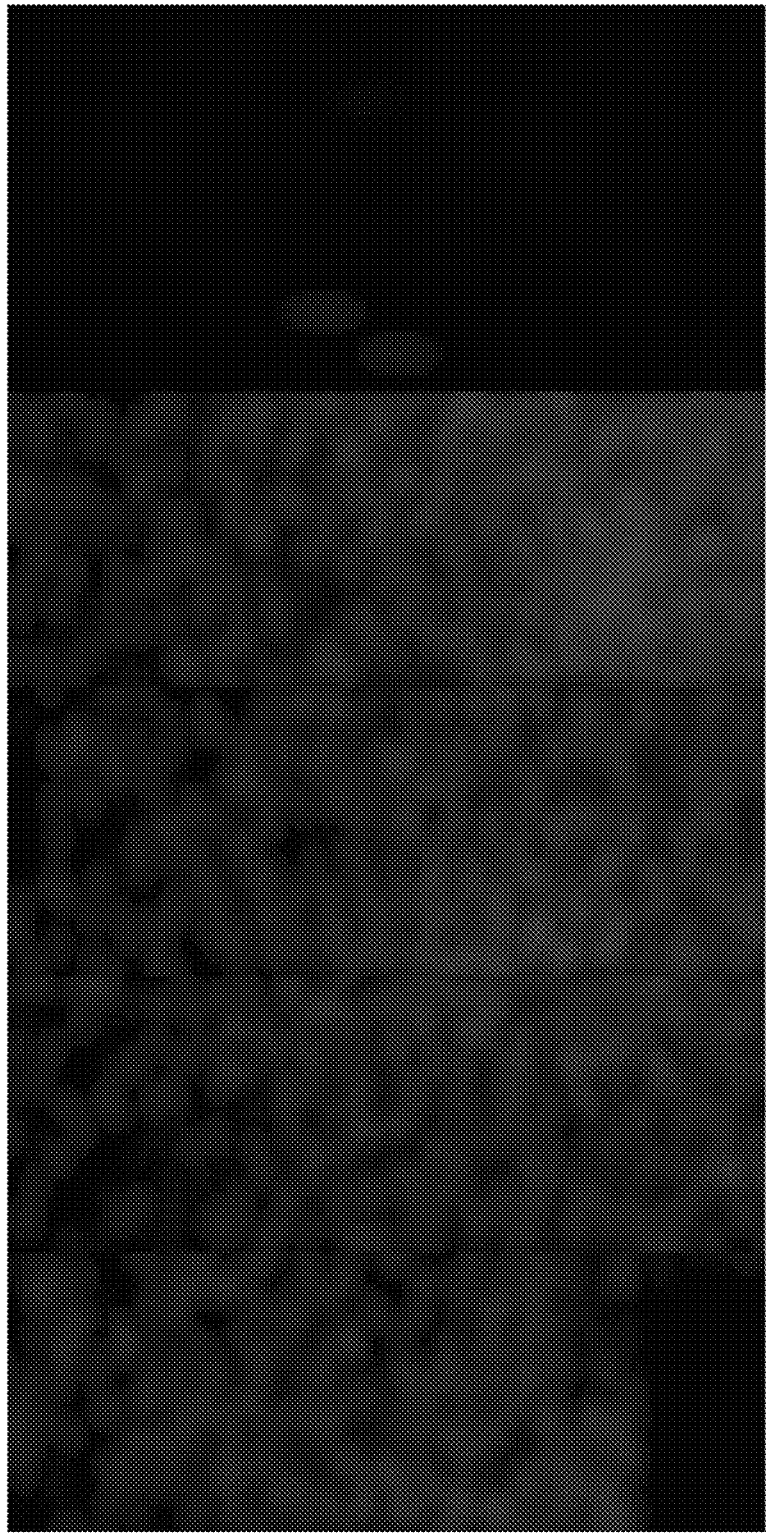
Figure 2I:
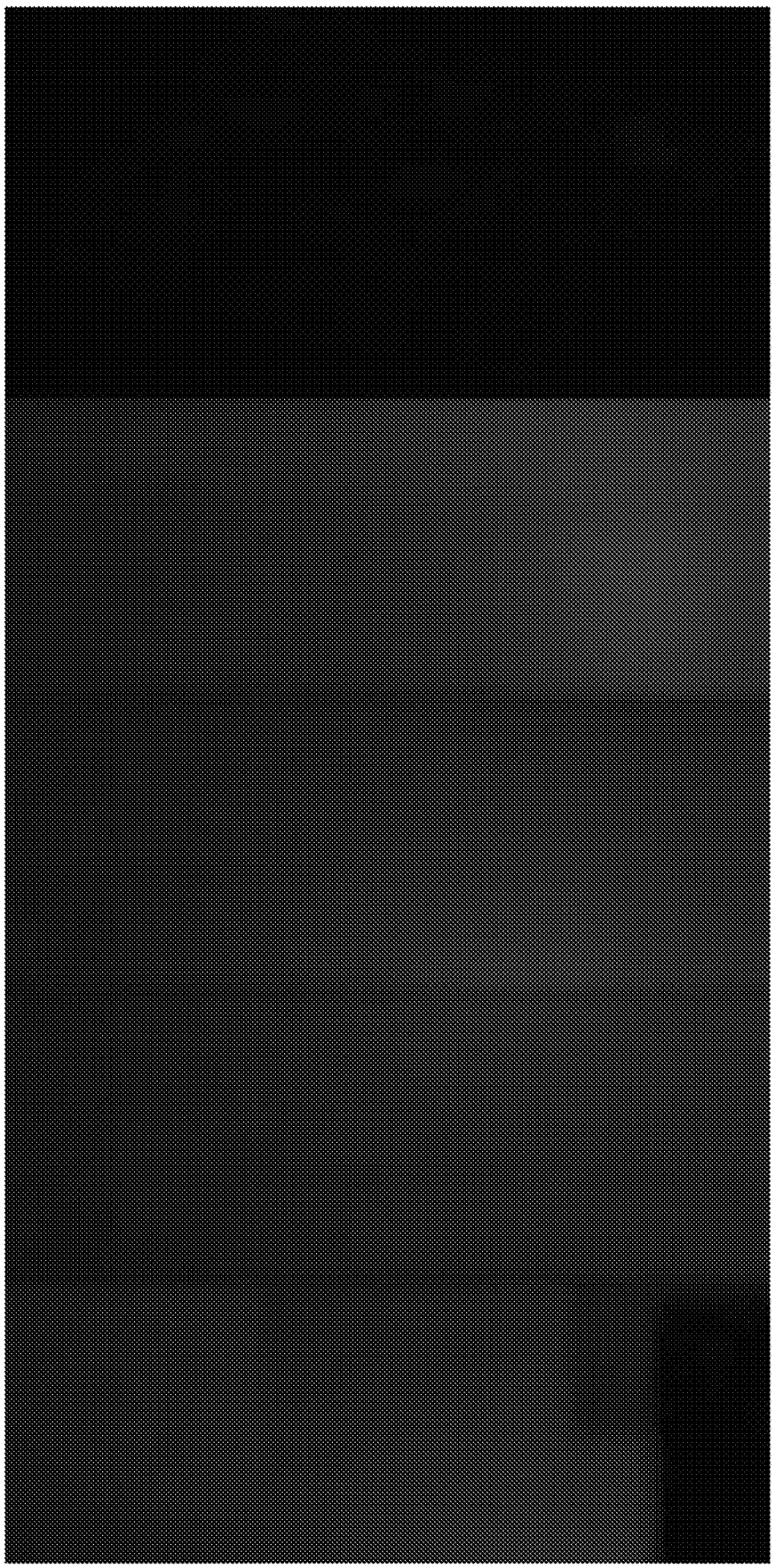
Figure 2N:
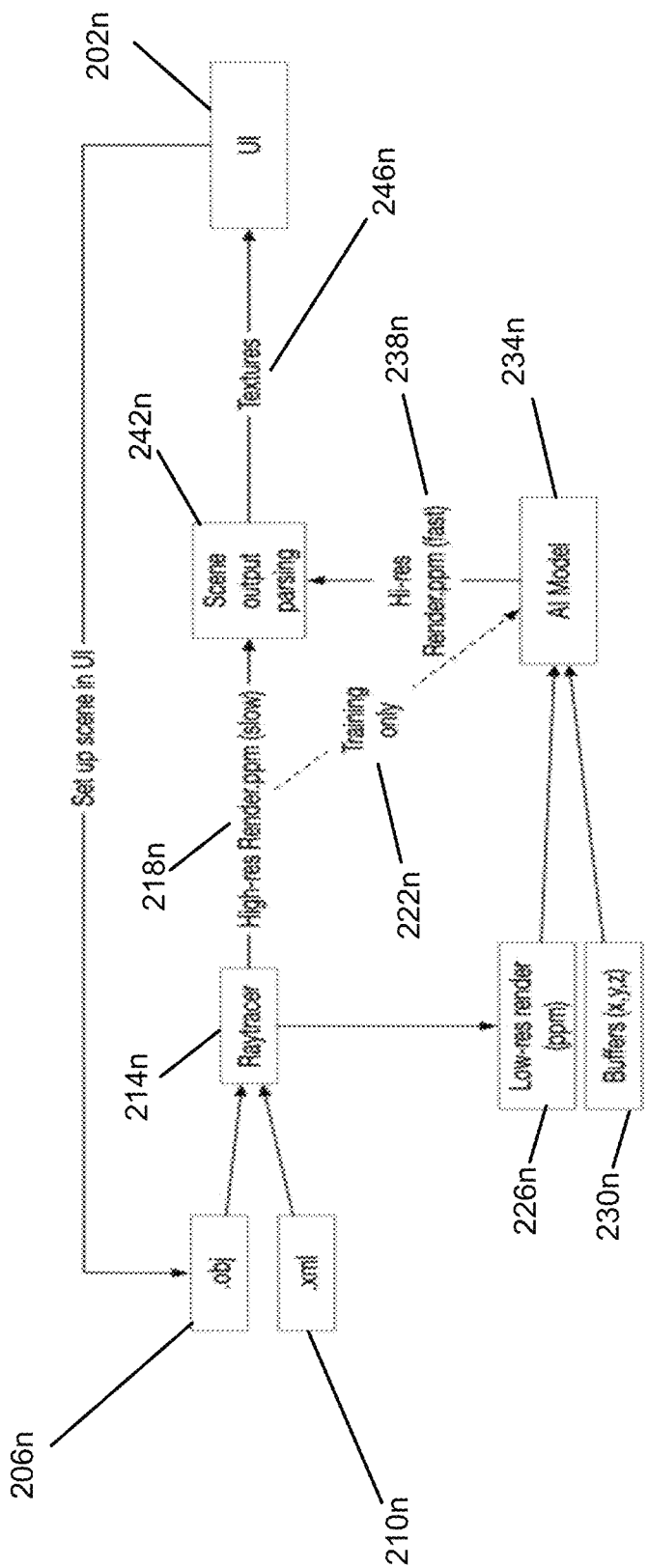
Figure 2O:
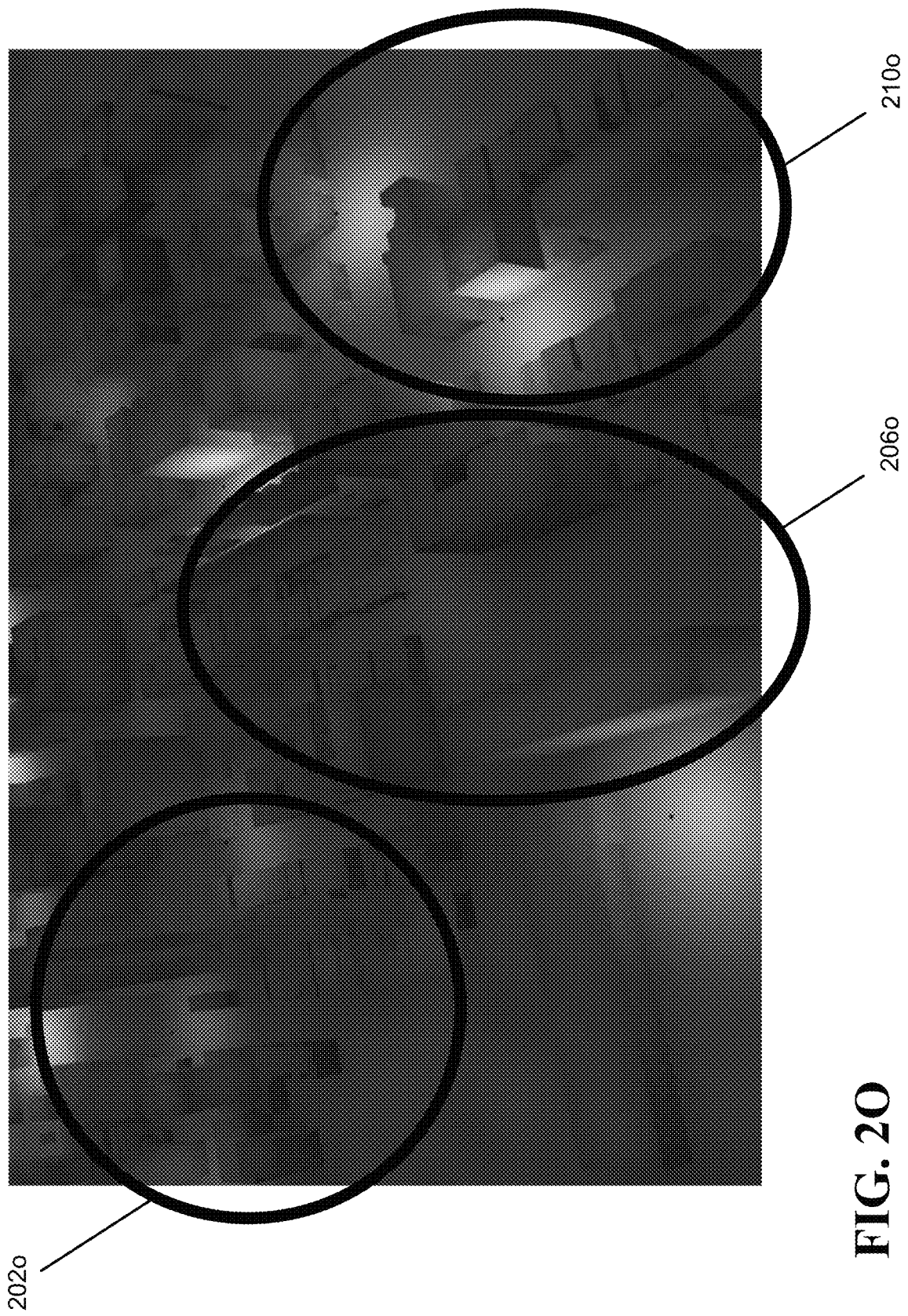

FIGS. 2A-2O are block diagrams illustrating or related to an example, non-limiting embodiment of a system functioning within the communication network of FIG. 1 in accordance with various aspects described herein.

The rollout of 5G and the growing use of millimeter-waves (e.g., frequencies above 6 GHz) in RANs lead to a densification of the network. Since shortwaves are obstructed by physical obstacles like buildings, trees, and the terrain, many new antennas are installed as part of the deployment of 5G cellular networks. When installing new antennas, their locations should be selected according to the obstacles in the deployment area. A RAN planner needs to select locations for antennas in such a way that there would provide good cellular coverage in the entire area while minimizing the number of antennas and the interference of antennas to one another. This optimization problem, of selecting locations for antennas, requires detailed models of the environment, reliable computation of radio propagation from selected antenna locations, and the ability to examine potential layouts of the antennas. However, computation and presentation of radio propagation over a detailed model of a large area is expensive, and if conducted in a naïve way, does not scale. Furthermore, an effective planning and design of wireless networks should efficiently examine and compare different deployment alternatives, and this can only be done if each test is very fast.

These embodiments present an approach of a radio propagation computation based on a combination of photon mapping and ML. The proposed approach supports near-real-time computation of the radio transmissions for different layouts of antennas. This allows planners to examine a large variety of antenna locations and layouts, change configuration details, e.g., tilting antennas or optimally selecting the sector that each antenna covers, and so on. Such a planning process has two effects. First, it increases the efficiency of the network. That is, it makes the network more reliable, saves installation costs and reduces the total number of antennas. Second, the planning process itself becomes faster and cheaper, by allowing planners to quickly and effortlessly examine many network configurations and test the effect of potential changes on the cellular coverage.

The suggested method trains and uses a ML model for computing signal strength and coverage, for a given geospatial setting. Model training is in two steps. In the first step, high-resolution images are created for some arbitrary setting, in order to generate training data for training the ML model as in FIG. 2A. In this regard, FIG. 2A depicts a 3D model of the world 202a and antenna locations 206a being provided as inputs to a photon mapping element 210a to generate a high-resolution model/images 214a supportive of the training data.

In the second step, the ML model is trained to generate high-resolution illumination results from low-resolution photon mappings as in FIG. 2B. In this respect, FIG. 2B depicts pairs of high-resolution and low-resolution images 204b being applied to a network 208b (e.g., a convolutional neural network (CNN)) to generate a trained model 212b.

In FIG. 2C after the model is trained, the ML model 212b is applied (as in 228c) to low-resolution photon mapping 220c (or associated low-resolution illumination map 224c) to create a high-resolution depiction/illumination map 232c of one or more network parameters, such as signal strength. The result is mapped to the 3D model of the world 202a (as shown in 236c) to generate a high-resolution 3D presentation of network parameters/characteristics, such as cellular coverage (as shown in 240c).

The embodiments of FIGS. 2A-2C present an approach for positioning shortwave cellular antennas and testing the resulting cellular coverage, for a selected layout. The computations may be conducted over a detailed geospatial model of a planned area based on radio propagation models. In the embodiments, instead of using an expensive high-resolution ray-tracing approach, the computation applies a combination of low-resolution photon mapping with a ML model that is trained to transform the low-resolution mapping into a high-resolution representation of the electromagnetic radiation.

Existing tools for planning and optimization of wireless networks typically rely on either high-resolution or low-resolution ray tracing, e.g., see Atoll (https://www.forsk.com/atoll-overview). The tool sends rays from the antennas in many different directions and the places where the rays hit a wall are marked. The computation may also model reflection, where rays that hit a wall are reflected from the wall, with lower intensity. This requires shooting and tracing many rays, to cover many directions.

Ray tracing using an Atoll tool can show areas with high, medium, and low reception (potentially distinguished from one another via depiction in colors—e.g., in red, yellow and blue), but it could take hours to compute such a model.

The ray tracing algorithm requires sending rays in all directions, from each antenna, and testing the intersection of each ray with walls and other obstacles. This process does not scale and cannot support effective wireless planning.

Photon mapping can be used in the first step of the computation. For example, see Rendering Techniques '96 (Proceedings of the Seventh Eurographics Workshop on Rendering), pages 21-30, 1996 entitled "Global Illumination using Photon Maps" Henrik Wann Jensen Department of Graphical Communication The Technical University of Denmark.

Photon mapping is a global illumination method that works in two phases. The first step simulates emission of protons from given light sources. The places where photons hit the surface within the scene are stored. In the second step, the scene can be rendered using a ray tracing algorithm, but instead of following rays from the camera to the light sources, the rays from the camera are followed till they hit a surface, and the amount of light (or any other electromagnetic radiation) in this location is computed based on the photons that were mapped to this point in the first computation step. To make the result more realistic, the first step also includes mapping of shadow photons to hidden surfaces, and limited recursive reflection and refraction of photons, to simulate radiance.

The problem of using ML for reconstructing image sequences that have a low resolution due to a low-budget sampling has been receiving some attention in the literature. A ML model for reconstruction is trained on sequences of pairs of low-quality and high-quality images. After training, the ML model computes the pixel color for pixels in the reconstructed image, based on the surrounding pixels in the low-resolution image. For each pixel in the input noisy image, seven scalar values are stored: noisy RGB color as three values, two-values for the normal vector to the surface, depth, and roughness. Typically, a square of 3×3 pixels is processed for computing the middle pixel color, but larger squares can be used, e.g., if the input data is very sparse.

Exemplary embodiments of this disclosure have many advantages, and thus, represent improvements to the technology associated with the subject matter of this disclosure. The embodiments apply the suggested method (photon mapping and ML-based reconstruction) to network planning while adapting the approach to radio propagation models, including free-space path loss, to take attenuation into account. Existing methods for reconstruction of low-quality or low-resolution images are designed for light, not for wireless transmissions. So, they should be adapted to the wireless spectrum, for accurate computation of radio propagation and cellular signal strength.

Embodiments of this disclosure utilize a computation adapted to 3D geospatial models of planning areas. The method is applied to a vector model of the world, rather than to a raster image. The buildings and all the other geospatial features have a vectorial representation, and as such, they can be processed effectively. In particular, the ML model is applied to different walls and the result can be mapped back to the scene regardless of transformations like rotation, translation, or scaling. This cannot be done using techniques that are built for raster images.

Embodiments of this disclosure take transmission frequencies and interferences into account. In existing methods for computing global illumination, when there are several light sources, the light at a point is the combination of the light arriving at that point from the different light sources. Two light beams with the same frequency reaching a single point would strengthen each other and result in a higher intensity than what each light source would induce separately. However, for cellular transmissions, if they are at different frequencies, there is no addition of the power, i.e., the signal strength does not become stronger, and there is no interference. If the transmissions have similar frequencies, they interfere with each other and make the cellular transmission less effective, because the device would receive concurrent transmissions at the same frequency from two antennas. Accordingly, the intersection of transmissions is handled for cellular planning in a very different way from the way computations are conducted for light. The embodiments include both a method for computing the interference and a method for presenting it. Note that in the method, in the photon mapping step the photons carry information about the source antenna, while in standard global illumination methods, such information is not carried by photons or by rays. The method effectively uses GPUs for efficiently training the ML model and applying it to the rendered scenes.

The creation of high-resolution images is a slow process that requires dispatching billions of rays. For example, the image in FIG. 2D was rendered using Monte Carlo ray tracing for a given, first/"red" light source 202d and a second/"green" light source 206d. The computation was done using GPUs and Compute Unified Device Architecture (CUDA®) as developed by NVIDIA, and it was shooting 400 billion rays. Even while using GPUs, the process took 30 minutes to render.

The two images in FIGS. 2E and 2F present the illumination for two buildings 202e and 202f, respectively, in the scene of FIG. 2D, from different perspectives. This is needed for the creation of the training data, i.e., the sequences of pairs of high-resolution and low-resolution illumination mappings.

As in FIG. 2G showing input shapes, the scene itself is composed of vectorial objects, constructed by the combination of 3D rectangular cuboids (boxes). The image is represented as a sequence of vertices and edges that represent the surfaces of the shape. The computation is conducted with respect to these shapes.

In addition to the high-resolution images, low-resolution images are generated as a result of a low-density photon-mapping process. This is a fast process where the number of dispatched photons is kept small. The resultant low-resolution photon mapping is depicted in FIG. 2H, which is a low-resolution buffer produced by the light-weight photon mapping.

The low-resolution buffer has a compatible high-resolution buffer, computed using the exhaustive process. For example, FIG. 2I illustrates a high-resolution buffer produced by the exhaustive photon mapping.

Such pairs are used for training the ML model (see, e.g., FIG. 2B). The model also receives the normal vector to the surface at each point, to apply the effect of the mapped photons properly.

The sequences of FIGS. 2J-2M present the results of applying the ML model to an input that consists of the low-resolution images, the normal vector at each point and the depth, where the right most image 252 in each of FIGS. 2J-2M is the high-resolution illumination image, the second from the right image 256 in each of FIGS. 2J-2M is the result of the ML reconstruction, and the three left images 260 in each of the sequences of FIGS. 2J-2M are the input to the model.

The computations represented by the sequences shown in FIGS. 2J-2M take about 200 milliseconds. So, instead of exhaustive computations that take hours, the methods/processes of this disclosure only need a fraction of a second to render the scene and present the effect of antennas on the signal strength in different locations. This is mainly critical in a dense urban area.

The image of FIG. 2N provides an overview of the process, including learning, training, and application phases. The result of the process is rendered using a user interface (UI) 202n that supports user interactions such as zooming-in zooming-out, rotating the scene to examine it from different perspectives, and so on. This can be done while selecting which transmitters (e.g., light sources) to turn on or off. In this respect, the scene may be set up in the UI 202n, as represented via one or more languages or file types (e.g., .obj 206n and .xml 210n). The (representation of the) scene may be provided as an input to a ray-tracer/ray-tracing algorithm and/or a photon mapper/photon mapping algorithm (one or more of which are represented by reference character 214n in FIG. 2N) to generate a high-resolution rendering 218n (such as for example in relation to a generation of training data and/or a training model 222n) and/or a low-resolution rendering 226n with accompanying buffer data/representation 230n in 3D (e.g., x, y, z). The training data 222n and the low-resolution rendering 226n (and any accompanying buffer data 230n) may be provided as an input to an AI/ML model 234n to generate a high-resolution rendering 238n. As represented in FIG. 2N via the labels slow and fast, the rendering 238n may be generated at a faster rate/speed relative to the rendering 218n. The rendering 218n and/or the rendering 238n may be parsed (as represented by reference character 242n) to identify characteristics (e.g., textures) 246n associated with the scene.

FIG. 2O illustrates an illumination result of the process described above in relation to FIG. 2N. In particular, in FIG. 2O portions of a scene are denoted via circles/reference characters 202o, 206o, and 210o. In some embodiments, the result/scene of FIG. 2O may be presented via a UI (see UI 202n of FIG. 2N). The portions 202o-210o may be represented via color-coding to facilitate a user being able to visually distinguish the portions from one another. For example, the portion 202o may generally be represented by a red-color or red hues, the portion 206o may generally be represented by a blue-color or blue hues, and the portion 210o may generally be represented by a green-color or green hues. Of course, other colors may be used in some embodiments. The color-coding (or other representation, as applied) may represent a characteristic/parameter of a network, such as coverage, signal strength, interference, noise, and so on.

While represented via discrete portions 202o-210o in FIG. 2O, in some embodiments the portions may tend to blend, or may be continuous, across boundaries. For example, and assuming that colors are used in the manner set forth above, the red colors/hues of the portion 202o may tend to blend with the blue colors/hues of the portion 206o near/proximal to the boundary/interface between the portions 202o and 206o.

TensorFlow can be used for training and applying a ML model, however, any other system for training CNNs can be used. For efficient computation, the system may use a tree-based spatial index to retrieve the mapped photons for a given area or surface. A quadtree may be used for such purposes, but any other type of spatial index might be used for fast retrieval of mapped photons.

Embodiments can provide the ability to compute and render fast, almost in real-time, the signal strength in an area (e.g., an urban area), for a potential deployment of antennas, which has a potential to revolutionize the field of network planning. Such embodiments allow to quickly test different deployment configurations, changes in antenna settings, like tilt, transmission frequency or transmission strength, and examine the effect of environmental changes, like a new building or a growing tree, on the signal strength in different streets.

Embodiments can support planning, design, and optimization of wireless networks. However, the embodiments have additional applications. First, they could be applied to other types of electromagnetic transmissions where transmissions with similar frequencies interfere with one another. Second, the fast computation of coverage could support real-time ad-hoc changes in antennas, for better supporting changing needs for cellular coverage. For example, suppose that there are antennas that can change their position quickly (e.g., carried on cars, drones, or balloons) or change their tilt and transmission range, in real-time. The fast computation of coverage area could be used for making real-time changes in the antenna positions to support better a case where there is a temporary growing demand for cellular services at a particular area. Third, by examining the difference between the computed signal strength and the actual measured signal strength at a given location, new obstacles could be detected, and either be removed (e.g., temporary construction) or added to the model (e.g., new building).

With the support of the real-time computation of cellular coverage, network planning tools could examine many different layout options for the antennas, the effect of small changes in the position or tilt of an antenna and the effect of changes in the environment on the coverage. This would support an optimization of the antenna positioning, to guarantee a more reliable network (better coverage) at a lower installation (CapEX) and maintenance (OpEX) costs.

Figure 2P:
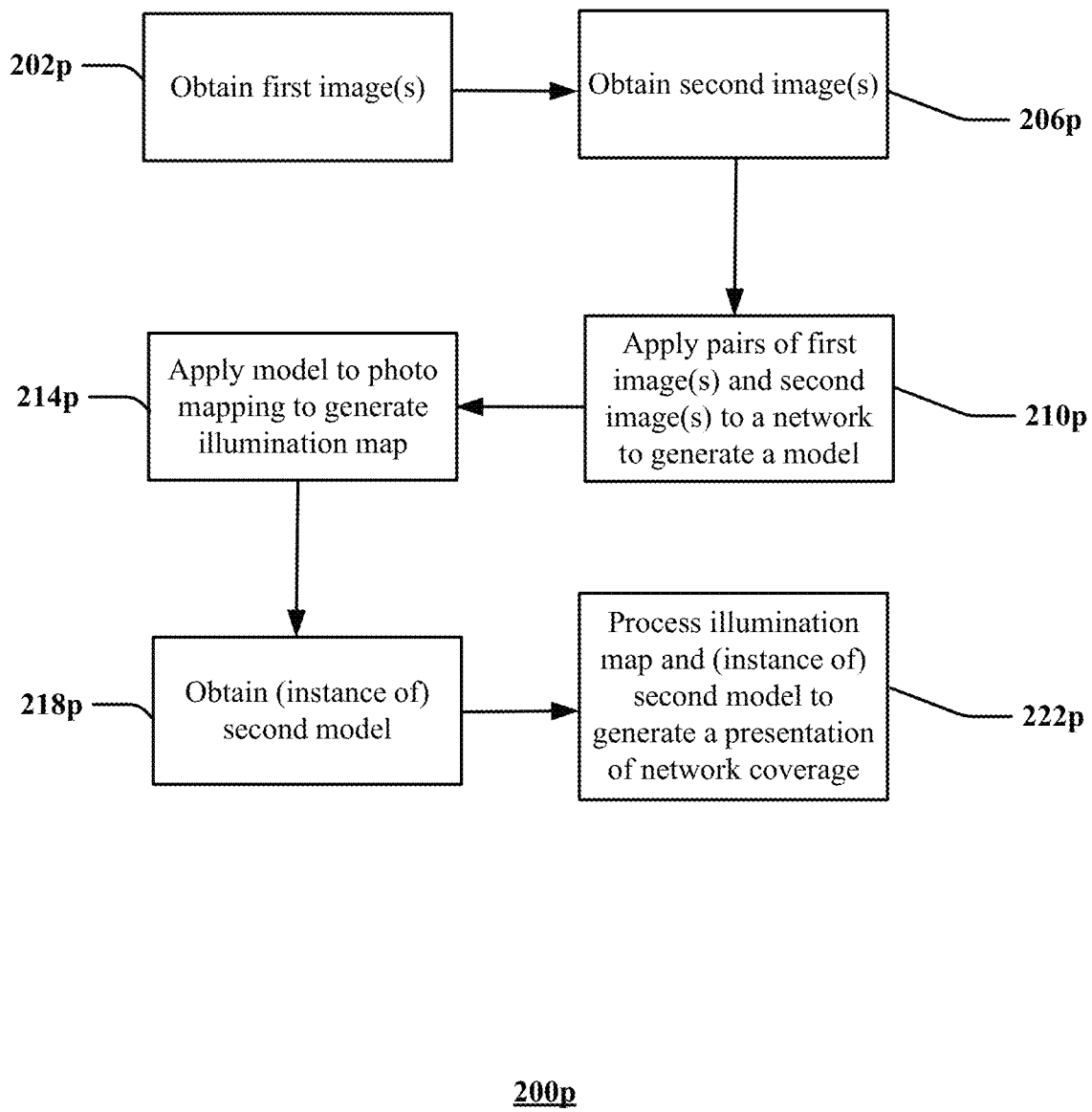

Referring now to FIG. 2P, an illustrative embodiment of a method $200p$ in accordance with various aspects described herein is shown. The method $200p$ may be facilitated, in whole or in part, by one or more systems, devices, and/or components, such as for example the systems, devices, and components set forth herein.

In block $202p$, one or more images (e.g., a first plurality of images) may be obtained. The image(s) of block $202p$ may be associated with an environment, such as for example an environment associated with a communication network. The environment may include one or more objects (e.g., may include a plurality of objects). For example, the object(s) may include one or more buildings, trees, foliage, signage, etc., or any combination thereof.

The image(s) of block $202p$ may be at a first resolution. The image(s) of block $202p$ may be obtained via a use of at least one electromagnetic source. The at least one electromagnetic source may include a plurality of light sources.

In some embodiments, block $202p$ may include causing the at least one electromagnetic source to emit a plurality of photons and storing locations within the environment where the plurality of photons intersect with respective surfaces, resulting in stored locations. In some embodiments, one or more algorithms (such as for example a ray tracing algorithm) may be applied to the stored locations to generate a rendering of the environment.

In block $206p$, one or more additional images (e.g., a second plurality of images) may be obtained. The image(s) of block $206p$ may be at a second resolution. The second resolution may be different from the first resolution of block $202p$; e.g., the first resolution may be greater than the second resolution. The image(s) of block $202p$ may be obtained via a use of at least one electromagnetic source (e.g., the at least one electromagnetic source of block $202p$). The image(s) of block $206p$ may be associated with an environment (e.g., the environment of block $202p$).

In block $210p$, pairs of the image(s) of block $202p$ and the image(s) of block $206p$ may be applied to a network (e.g., a neural network) to generate a model (e.g., a trained model). In some embodiments, the pairs may be identified in block $210p$ based on geographical/geospatial coordinates associated with the images of blocks $202p$ and $206p$ matching one another within a threshold amount. The coordinates may be identified in metadata associated with the images.

In block $214p$, the model of block $210p$ may be applied to a photon mapping at a third resolution to generate an illumination map at a fourth resolution. The fourth resolution may be different from the third resolution; e.g., the fourth resolution may be greater than the third resolution. In some embodiments, the photon mapping may be based on locations of one or more antennas; as part of block $214p$, the location(s) of the antenna(s) may be obtained.

In block $218p$, a(n instance of a) second model of the environment may be obtained. For example, as part of block $218p$ the (instance of the) second model may be generated. The (instance of the) second model may include an indication of radio propagation conditions within the environment. The (instance of the) second model may include a 3D model. The objects included in the environment may be represented in the (instance of the) second model via a vectorial representation.

In block $222p$, the illumination map (of block $214p$) and the (instance of the) second model (of block $218p$) may be processed. The processing of block $222p$ may result in a generation of a presentation of a network coverage associated with the environment. The presentation of the network coverage may include a 3D presentation of the network coverage at, e.g., the fourth resolution. The presentation of block $222p$ may include a coverage pertaining to, e.g., a cellular network, a WiFi network, etc., or any combination thereof. The presentation of the network coverage may include a presentation of a signal strength associated with one or more signals. The signal(s) may have a frequency that is greater than 1 GHz, 5 GHz, 6 GHz, etc. The presentation of block $222p$ may be rendered via one or more devices or outputs, such as for example via audio equipment, display devices, reports, messages, etc.

Aspects of the method $200p$ (e.g., one or more portions of the blocks of the method $200p$) may be executed iteratively or repeatedly (potentially as part of one or more loops of an algorithm) to respond to changes in conditions and/or in response to an occurrence of one or more events. For example, subsequent to the obtaining of the (first instance of the) second model during a first execution of block $218p$, block $218p$ may be executed a second time/again to obtain another/second instance of the second model (e.g., a third model) of the environment. The second instance of the second model may include an indication of second radio propagation conditions that are at least partially (and perhaps wholly) different from the radio propagation conditions associated with/identified as part of the first execution of block $218p$. A second/another execution of block $222p$ may include processing the illumination map (of block $214p$) and the second instance of the second model (potentially in real-time or in near-real-time) to generate a second presentation of the network coverage associated with the environment. The second presentation of the network coverage may be at least partially (and perhaps wholly) different from the presentation of the network coverage associated with the first execution of block $222p$.

While for purposes of simplicity of explanation, the respective processes are shown and described, it is to be understood and appreciated that the claimed subject matter is not limited by the order of any blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100. For example, virtualized communication network 300 can facilitate in whole or in part network deployment or radio-propagation computation based on a combination of photon mapping and machine learning including supporting near-real-time computation of the radio transmissions for different layouts of antennas and allowing examination of a large variety of antenna locations and layouts, changing configuration details, e.g., tilting antennas or optimally selecting the sector that each antenna covers, and so on.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
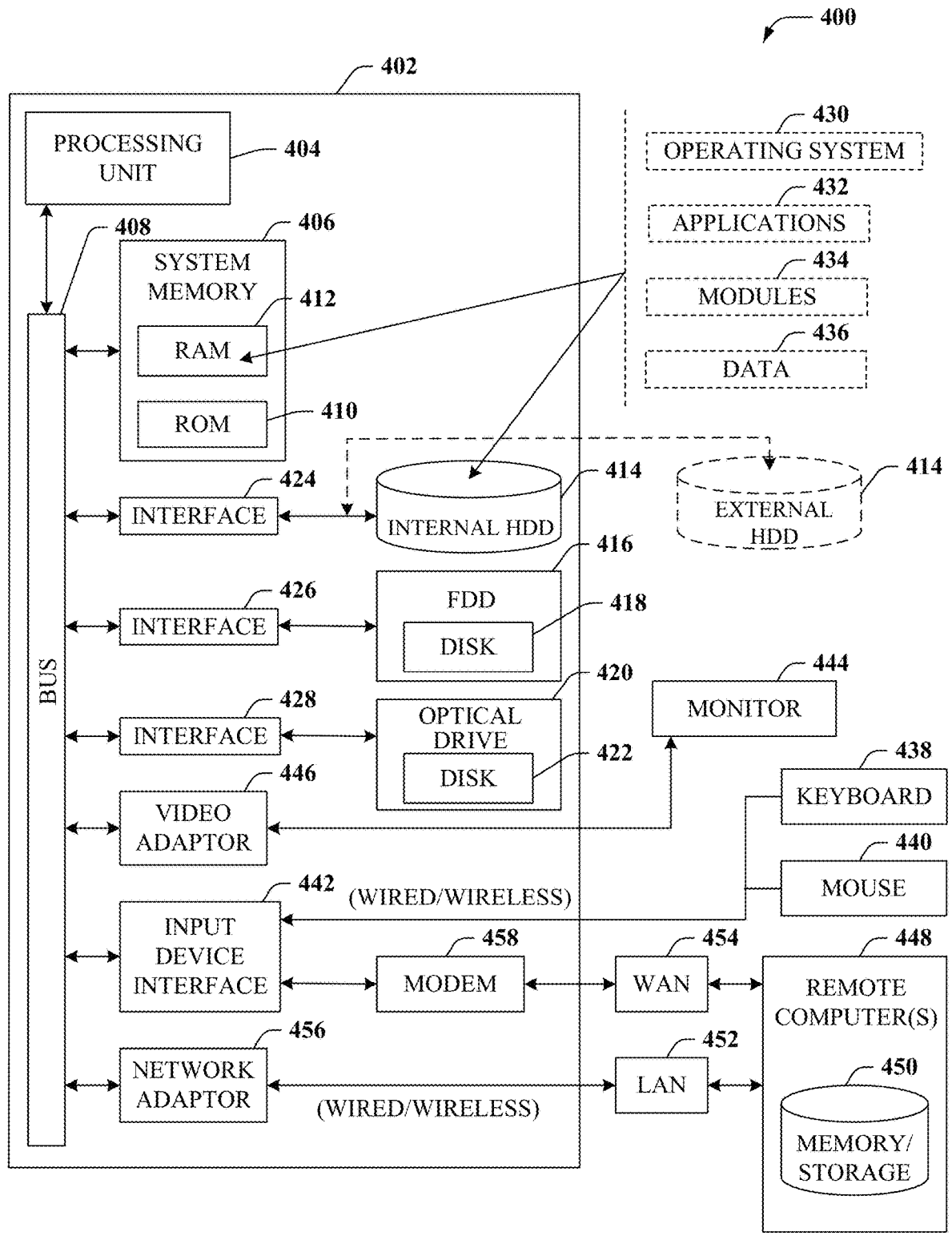
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part network deployment or radio-propagation computation based on a combination of photon mapping and machine learning including supporting near-real-time computation of the radio transmissions for different layouts of antennas and allowing examination of a large variety of antenna locations and layouts, changing configuration details, e.g., tilting antennas or optimally selecting the sector that each antenna covers, and so on.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
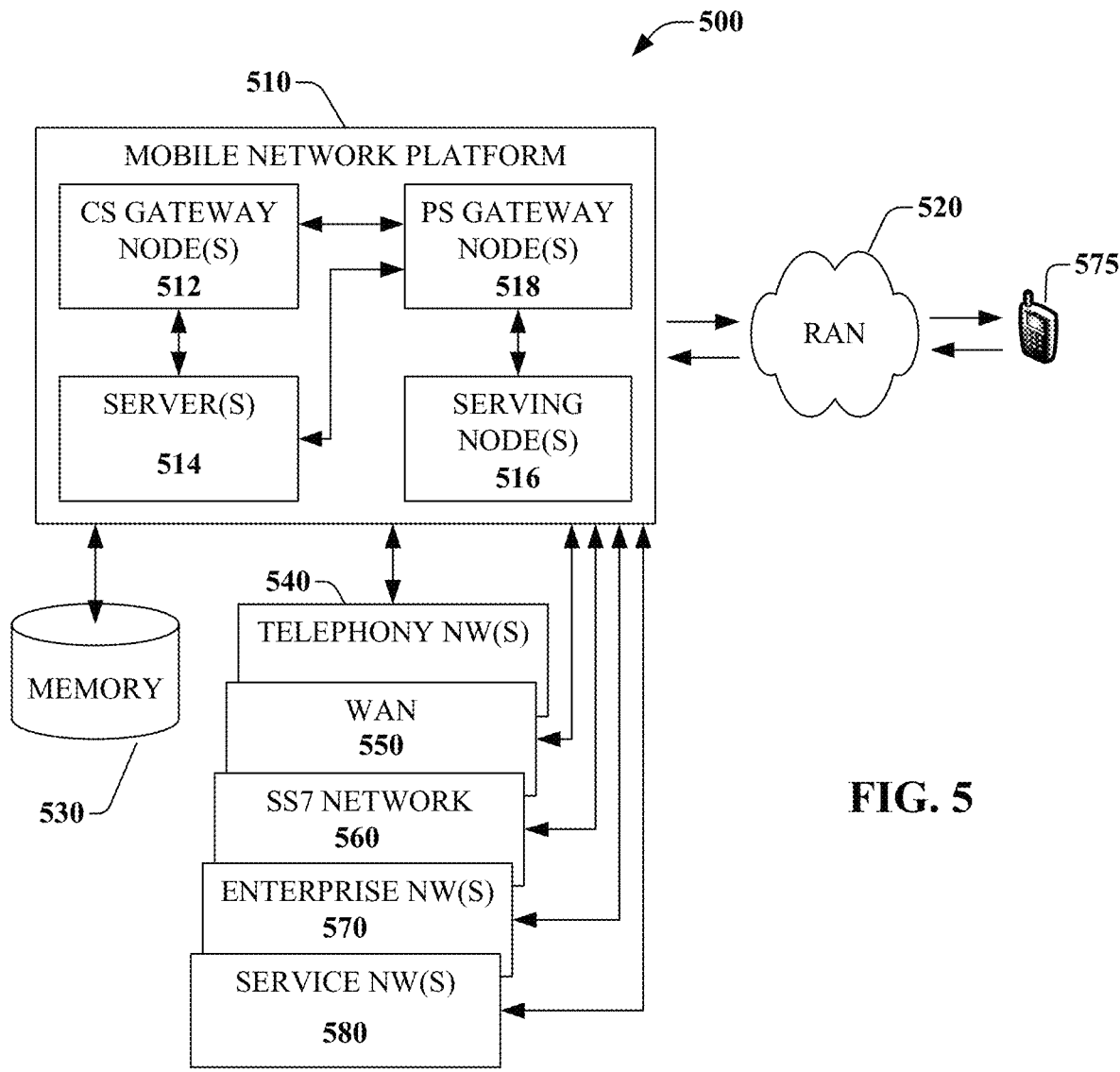
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part network deployment or radio-propagation computation based on a combination of photon mapping and machine learning including supporting near-real-time computation of the radio transmissions for different layouts of antennas and allowing examination of a large variety of antenna locations and layouts, changing configuration details, e.g., tilting antennas or optimally selecting the sector that each antenna covers, and so on.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
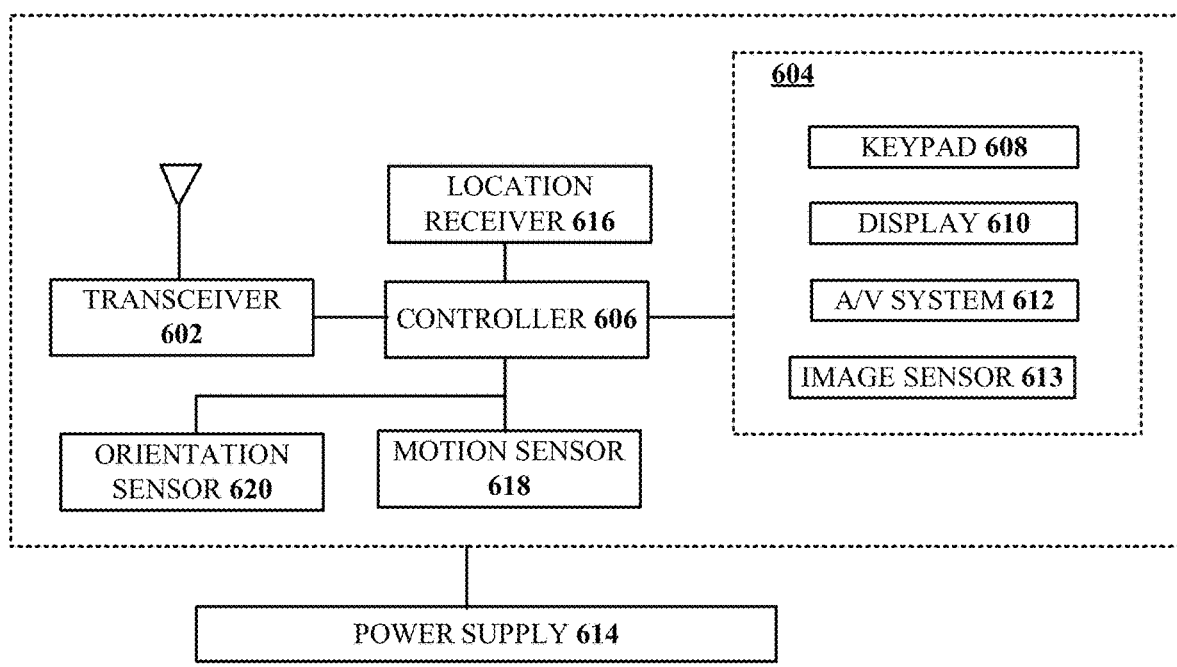
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part network deployment or radio-propagation computation based on a combination of photon mapping and machine learning including supporting near-real-time computation of the radio transmissions for different layouts of antennas and allowing examination of a large variety of antenna locations and layouts, changing configuration details, e.g., tilting antennas or optimally selecting the sector that each antenna covers, and so on.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate a performance of operations, the operations comprising:
obtaining a first plurality of images at a first resolution via a use of at least one electromagnetic source, wherein the first plurality of images is associated with an environment comprising a plurality of objects;

obtaining a second plurality of images at a second resolution via a use of the at least one electromagnetic source, wherein the second plurality of images is associated with the environment, and wherein the second resolution is different from the first resolution;

applying respective pairs of the first plurality of images and the second plurality of images to a neural network to generate a trained model;

applying the trained model to a photon mapping at a third resolution to generate an illumination map at a fourth resolution;

obtaining a second model of the environment, wherein the second model comprises an indication of radio propagation conditions within the environment; and processing the illumination map and the second model to generate a presentation of a network coverage associated with the environment.

2. The device of claim 1, wherein the first resolution is greater than the second resolution.

3. The device of claim 2, wherein the fourth resolution is greater than the third resolution.

4. The device of claim 1, wherein the fourth resolution is greater than the third resolution.

5. The device of claim 1, wherein the second model comprises a three-dimensional model, and wherein the plurality of objects is represented in the second model via a vectorial representation.

6. The device of claim 1, wherein the presentation of the network coverage includes a three-dimensional presentation of the network coverage at the fourth resolution.

7. The device of claim 1, wherein the presentation of the network coverage includes a coverage pertaining to a cellular network, a WiFi network, or a combination thereof.

8. The device of claim 7, wherein the presentation of the network coverage comprises a presentation of a signal strength associated with a signal.

9. The device of claim 8, wherein the signal has a frequency that is greater than 1 GHz.

10. The device of claim 9, wherein the signal has a frequency that is greater than 6 GHz.

11. The device of claim 1, wherein the at least one electromagnetic source comprises a plurality of light sources.

12. The device of claim 1, wherein the operations further comprise:

causing the at least one electromagnetic source to emit a plurality of photons; and storing locations within the environment where the plurality of photons intersect with respective surfaces, resulting in stored locations.

13. The device of claim 12, wherein the operations further comprise:

generating a rendering of the environment by applying a ray tracing algorithm to the stored locations.

14. The device of claim 1, wherein the plurality of objects comprises: a plurality of buildings, trees, foliage, signage, or any combination thereof.

15. The device of claim 1, wherein the operations further comprise:

obtaining locations of a plurality of antennas, wherein the photon mapping is based on the locations of the plurality of antennas.

16. The device of claim 1, wherein the operations further comprise:

subsequent to the obtaining of the second model, obtaining a third model of the environment, wherein the third model comprises an indication of second radio propagation conditions within the environment, and wherein the second radio propagation conditions are at least partially different from the radio propagation conditions; and processing the illumination map and the third model in real-time to generate a second presentation of the network coverage associated with the environment, wherein the second presentation of the network coverage is at least partially different from the presentation of the network coverage.

17. A non-transitory machine-readable medium, comprising executable instructions that, when executed by a processing system including a processor, facilitate a performance of operations, the operations comprising:

applying respective pairs of a first plurality of images associated with an environment and a second plurality of images associated with the environment to a network to generate a first model, wherein each of the first plurality of images is at a first resolution and each of the second plurality of images is at a second resolution that is different from the first resolution;

applying the first model to a photon mapping at a third resolution to generate an illumination map at a fourth resolution;

obtaining a second model of the environment, wherein the second model comprises an indication of radio propagation conditions within the environment; and processing the illumination map and the second model to generate a presentation of a network coverage associated with the environment.

18. The non-transitory machine-readable medium of claim 17, wherein the presentation of the network coverage comprises a rendering of an object in the environment, an identification of a first signal strength associated with a first signal, an identification of a second signal strength associated with a second signal, an identification of first interference in a first portion of the environment, and an identification of second interference in a second portion of the environment, wherein the second interference is different from the first interference and the second signal strength is different from the first signal strength.

19. A method, comprising:

applying, by a processing system including a processor, at least a first image at a first resolution and at least a second image at a second resolution to a network to generate a trained model;

applying, by the processing system, the trained model to a photon mapping at a third resolution to generate an illumination map at a fourth resolution, the fourth resolution being greater than the third resolution; and processing, by the processing system, the illumination map based on an identification of radio propagation conditions within an environment to generate an identification of a network coverage associated with the environment.

20. The method of claim 19, wherein the at least a first image comprises a first plurality of images associated with the environment, wherein the at least a second image comprises a second plurality of images associated with the environment, wherein the applying of the at least a first image at the first resolution and the at least a second image at the second resolution to the network comprises applying respective pairs of the first plurality of images and the second plurality of images, the method further comprising:

identifying, by the processing system, the respective pairs based on respective metadata associated with each of the first plurality of images and the second plurality of images; and selecting, by the processing system, a plurality of parameters for an antenna based on the identification of the network coverage, wherein the plurality of parameters comprises: location, tilt, transmission frequency, transmission strength, or any combination thereof.

* * * * *